(12) United States Patent
Higbee et al.

(10) Patent No.: US 9,962,665 B2
(45) Date of Patent: May 8, 2018

(54) HIGH EFFICIENCY, NON-RAGGING, FORMED AXIAL IMPELLER

(71) Applicant: Philadelphia Mixing Solutions, Ltd., Palmyra, PA (US)

(72) Inventors: Robert W. Higbee, Harrisburg, PA (US); Wojciech Wyczalkowski, St. Augustine, FL (US); Jason J. Giacomelli, Harrisburg, PA (US)

(73) Assignee: Philadelphia Mixing Solutions, Ltd., Palmyra, PA (US)

( * ) Notice: Subject to any disclaimer, the term of this patent is extended or adjusted under 35 U.S.C. 154(b) by 251 days.

(21) Appl. No.: 14/409,243

(22) PCT Filed: Jun. 20, 2013

(86) PCT No.: PCT/US2013/046712
§ 371 (c)(1),
(2) Date: Dec. 18, 2014

(87) PCT Pub. No.: WO2013/192376
PCT Pub. Date: Dec. 27, 2013

(65) Prior Publication Data
US 2015/0165397 A1    Jun. 18, 2015

Related U.S. Application Data

(60) Provisional application No. 61/662,259, filed on Jun. 20, 2012.

(51) Int. Cl.
*B23P 15/02* (2006.01)
*B01F 7/00* (2006.01)

(52) U.S. Cl.
CPC ...... *B01F 7/00275* (2013.01); *B01F 7/00033* (2013.01); *B01F 7/00091* (2013.01);
(Continued)

(58) Field of Classification Search
CPC ............... B23P 15/02; Y10T 29/49336; B01F 2215/0431; B01F 2215/0459;
(Continued)

(56) References Cited

U.S. PATENT DOCUMENTS

| 1,346,508 A | * | 7/1920 | Olhovsky | ............... B64C 11/04 |
| | | | | 29/889.6 |
| 1,365,808 A | * | 1/1921 | Wood | ..................... B64C 11/00 |
| | | | | 416/232 |

(Continued)

FOREIGN PATENT DOCUMENTS

| GB | 28673 A | 7/1911 |
| GB | 262860 A | 12/1926 |

(Continued)

*Primary Examiner* — Tony G Soohoo
(74) *Attorney, Agent, or Firm* — Baker & Hostetler LLP

(57) ABSTRACT

An axial impeller has blades formed from sheet metal blanks that are configured from taking a desired impeller blade and mathematically "unwinding" the blade to its flat counterpart. Preferably, the impeller blade is formed from a single rolling operation. The result of a thin, elongate blade, preferably having a trailing edge that defines a helix with rearwardly skewed, forwardly raked blades, provides an efficient impeller having good anti-ragging properties.

22 Claims, 7 Drawing Sheets

(52) U.S. Cl.
CPC .......... *B01F 7/00341* (2013.01); *B23P 15/02* (2013.01); *B01F 2215/0431* (2013.01); *B01F 2215/0459* (2013.01); *Y10T 29/49336* (2015.01)

(58) Field of Classification Search
CPC .............. B01F 7/00033; B01F 7/00091; B01F 7/00275; B01F 7/00341
USPC .......................................... 29/889.7; 366/343
See application file for complete search history.

(56) References Cited

U.S. PATENT DOCUMENTS

| | | | | |
|---|---|---|---|---|
| 1,404,298 A * | 1/1922 | Jacobs | ................... | F04D 29/325 416/132 A |
| 1,420,278 A * | 6/1922 | Parsons | ................... | B21K 3/04 29/889.7 |
| 1,539,273 A * | 5/1925 | Reed | ................... | B64C 11/04 416/214 R |
| 1,555,895 A * | 10/1925 | Weber | ................... | B21D 19/12 29/423 |
| 1,850,199 A * | 3/1932 | Bryant | ................ | B01F 7/00341 366/330.7 |
| 1,872,483 A * | 8/1932 | Meyer | ................... | A45D 20/34 29/889.3 |
| 1,973,266 A * | 9/1934 | Perry | ................... | B64C 11/00 416/175 |
| 2,064,845 A * | 12/1936 | Moray | ................... | F04D 29/34 416/228 |
| 2,334,456 A * | 11/1943 | Thorp | ................... | B21D 53/78 29/889.3 |
| 2,349,474 A * | 5/1944 | Thorp | ................... | F04D 29/382 416/220 A |
| 2,620,886 A * | 12/1952 | Turner | ................... | F04D 29/362 416/144 |
| 2,725,233 A * | 11/1955 | Werner | ................... | F42B 6/06 244/3.3 |
| 2,986,193 A * | 5/1961 | Howell | ................... | B21D 5/08 226/181 |
| 3,028,072 A * | 4/1962 | Atalla | ................... | F04D 29/326 415/91 |
| 3,241,743 A * | 3/1966 | Laing | ................... | B21D 53/027 165/122 |
| 3,315,749 A * | 4/1967 | Parsons | ................... | F01P 7/06 415/195 |
| 3,485,116 A * | 12/1969 | Fender | ................... | B21C 37/26 29/456 |
| 3,542,343 A | 11/1970 | Stoelting et al. | | |
| 3,664,165 A * | 5/1972 | Harvill | ................... | B21D 11/20 29/889.7 |
| 3,827,482 A * | 8/1974 | Pope | ................... | F04D 29/384 123/41.49 |
| 3,858,428 A * | 1/1975 | Thompson | ................ | B21H 7/16 228/158 |
| 3,893,214 A * | 7/1975 | Parkinson | ............ | B21D 31/043 29/6.2 |
| 3,904,714 A | 9/1975 | Rooney et al. | | |
| 4,147,437 A * | 4/1979 | Jonqueres | ........... | B01F 7/00341 366/330.5 |
| 4,163,631 A | 8/1979 | Connolly et al. | | |
| 4,380,399 A * | 4/1983 | Godat | ................... | B01F 7/1695 366/289 |
| 4,468,130 A | 8/1984 | Weetman | | |
| 4,482,298 A | 11/1984 | Hannon et al. | | |
| 4,571,090 A | 2/1986 | Weetman et al. | | |
| 4,575,256 A | 3/1986 | Armiage et al. | | |
| 4,610,601 A * | 9/1986 | Gerfast | ..................... | F03D 1/04 29/889.3 |
| 4,693,673 A * | 9/1987 | Nee | ........................ | F04D 29/38 416/175 |
| 4,867,643 A * | 9/1989 | Appleton | ............... | F04D 29/327 416/175 |
| 5,007,801 A * | 4/1991 | Hopfensperger | ...... | B21D 53/78 416/223 R |
| 5,052,892 A * | 10/1991 | Fasano | .................... | B01F 7/001 416/204 R |
| 5,249,993 A | 10/1993 | Martin | | |
| 5,297,938 A * | 3/1994 | Von Essen | .......... | B01F 7/00341 366/330.2 |
| 6,431,834 B1 | 8/2002 | Lackey et al. | | |
| 7,473,025 B1 * | 1/2009 | Howk | ................. | B01F 7/00341 29/889.7 |
| 2004/0145966 A1 * | 7/2004 | Kar | ....................... | B01F 3/1221 366/329.1 |
| 2009/0314698 A1 * | 12/2009 | Higbee | ............... | B01F 7/00341 210/150 |
| 2012/0188843 A1 * | 7/2012 | Hahn | ................... | B01F 7/00341 366/270 |
| 2013/0343897 A1 * | 12/2013 | Collins | .................... | F01D 5/14 416/223 R |
| 2015/0165397 A1 * | 6/2015 | Higbee | ............... | B01F 7/00275 366/343 |
| 2016/0102674 A1 * | 4/2016 | Hancock | ................ | B21D 22/02 416/223 R |

FOREIGN PATENT DOCUMENTS

JP          S58-174229 A     10/1983
WO     WO 2011/036113 A2    3/2011

* cited by examiner

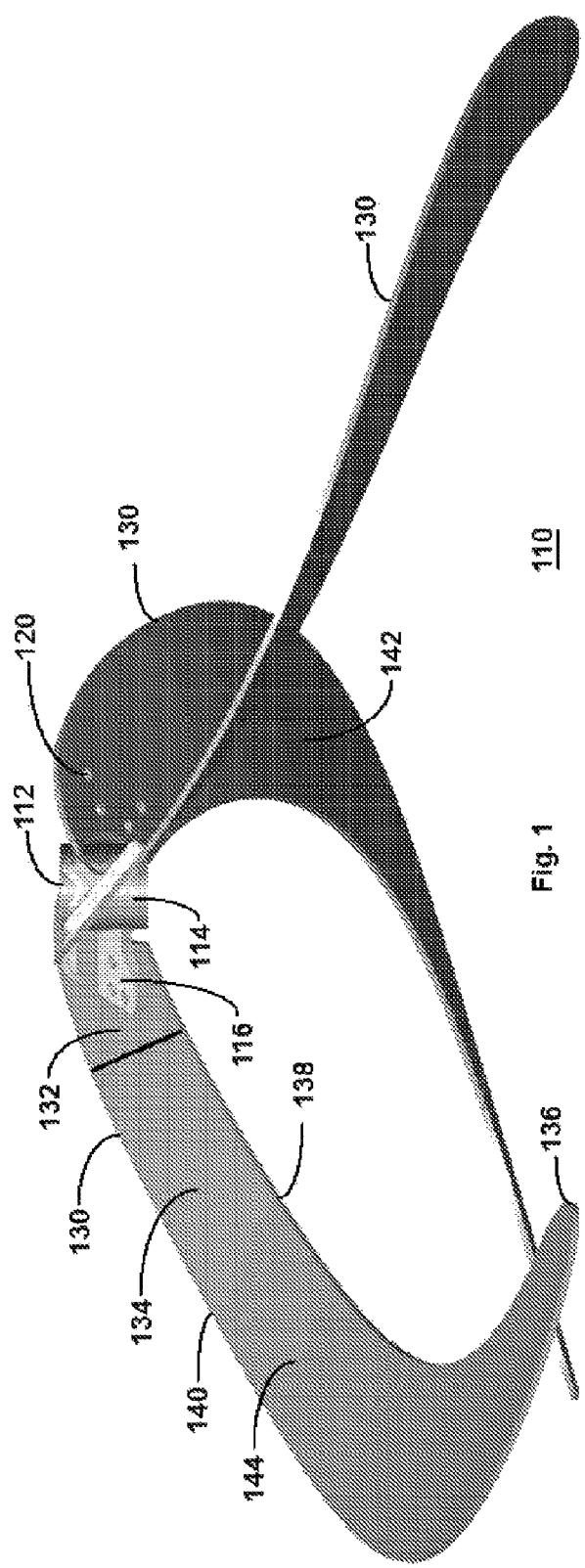

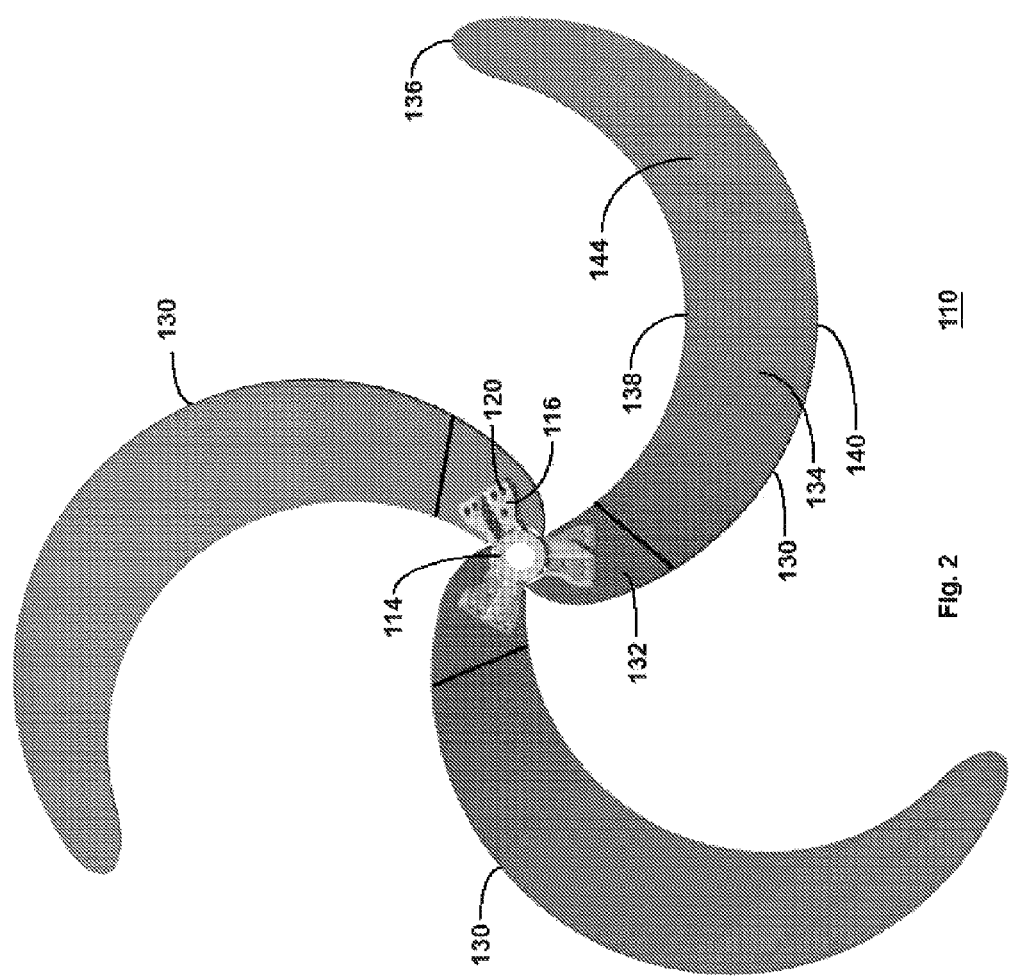

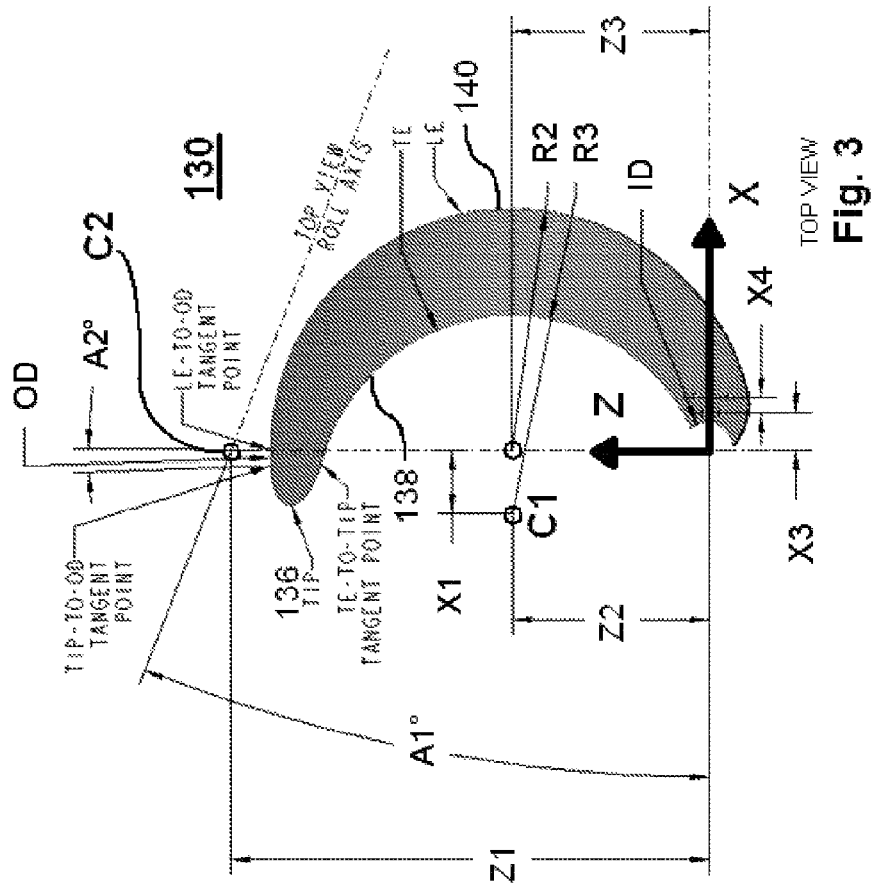
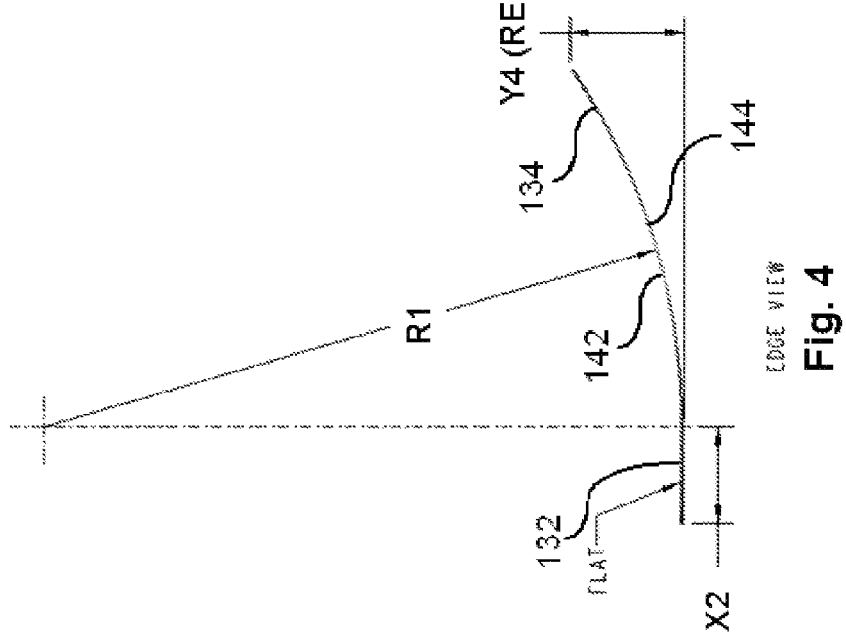

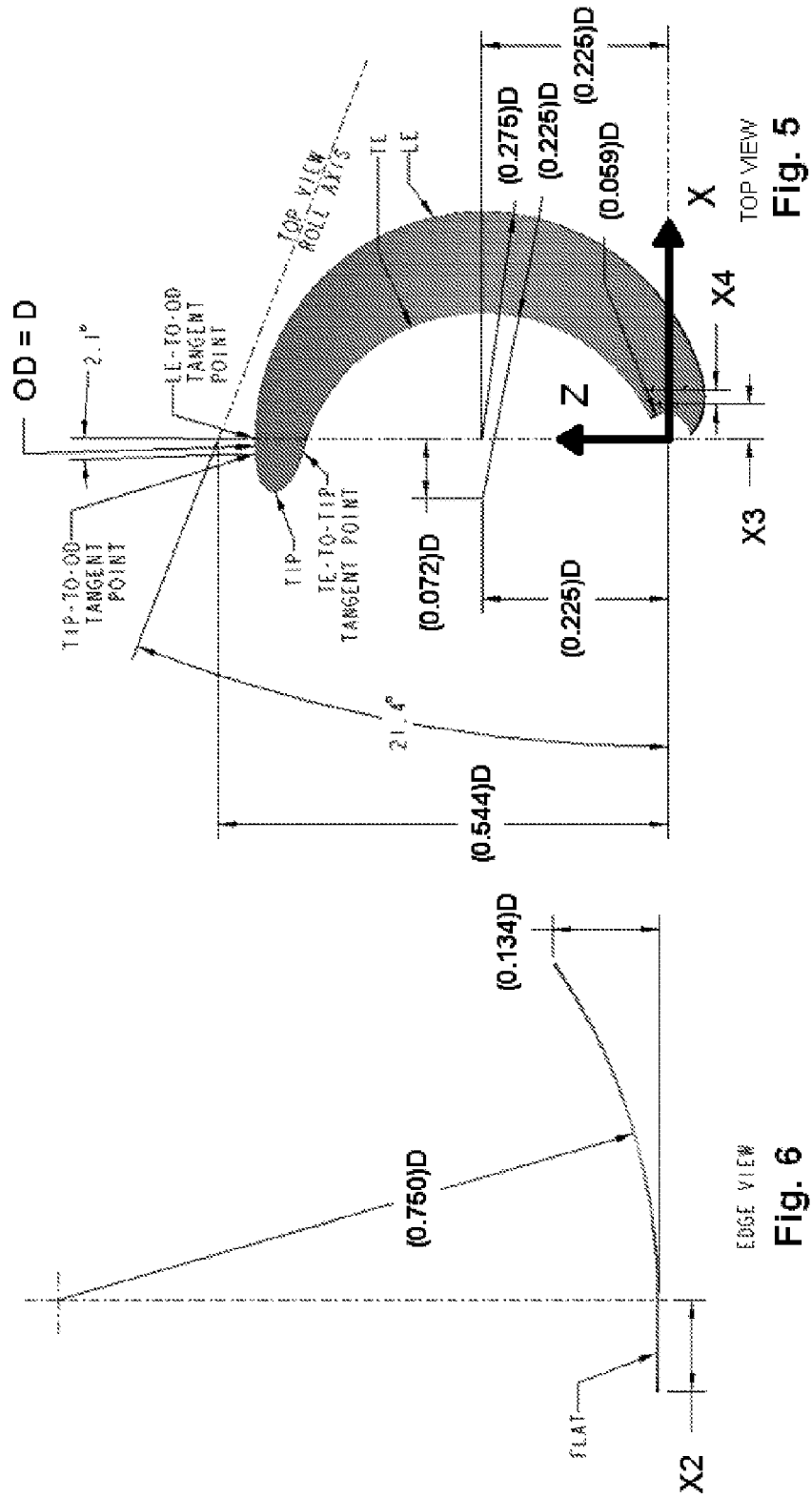

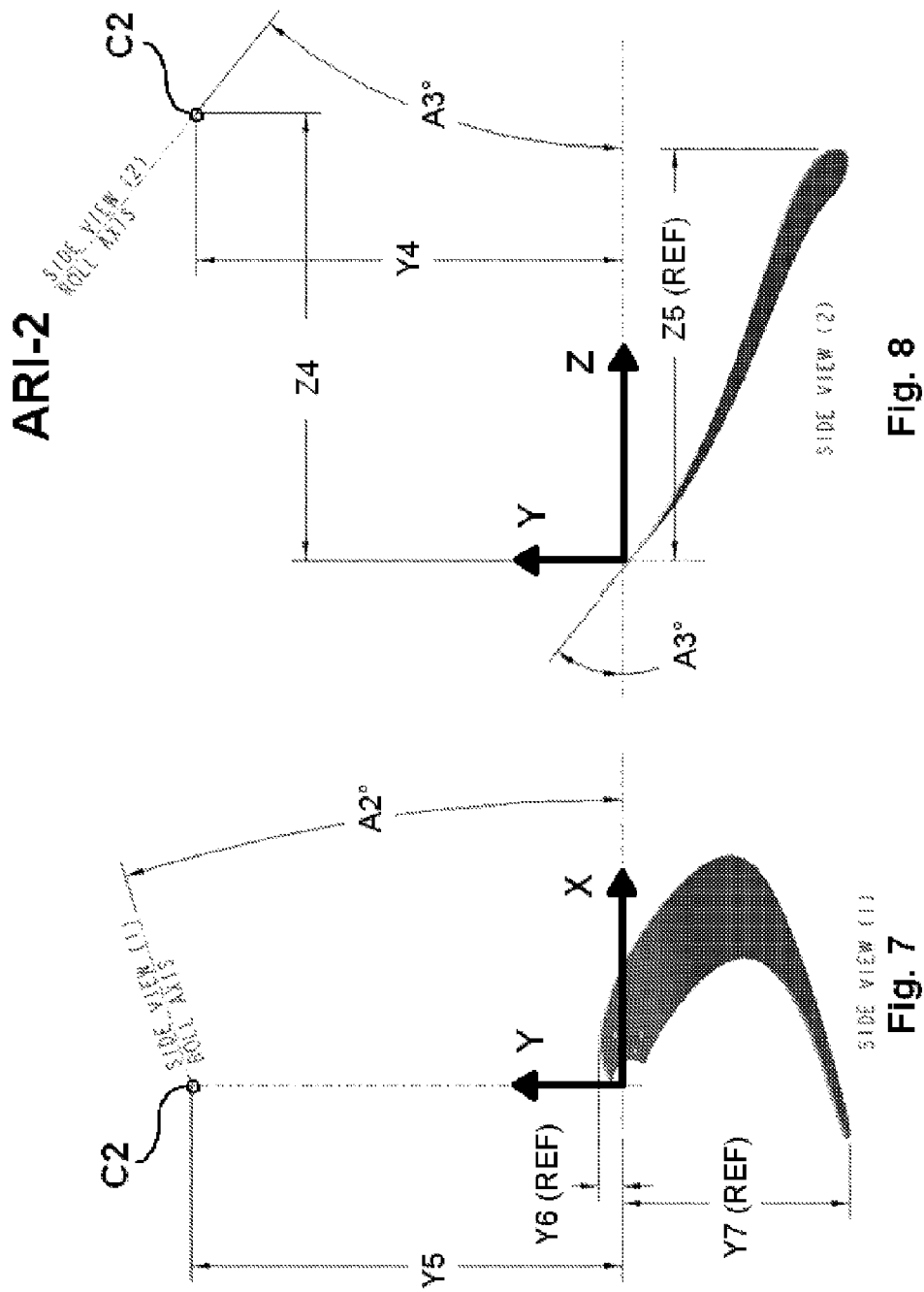

HIGH EFFICIENCY, NON-RAGGING, FORMED AXIAL IMPELLER

CROSS-REFERENCE TO RELATED APPLICATIONS

This application is the National Stage of International Application No. PCT/US2013/046712, filed Jun. 20, 2013, which claims the benefit of U.S. provisional application No. 61/662,259, filed Jun. 20, 2012, the disclosures of which are incorporated herein by reference in their entirety.

BACKGROUND

The invention relates to the mixing apparatus and in particular to the impeller for blending of liquids and solids suspensions in liquids, for example where such liquids might contain a significant concentration of rag-like, stringy, fibrous material, and methods for forming the mixing apparatus.

Impellers for industrial mixing applications are widespread. Impeller efficiency for mixing can be characterized by the amount of energy that is needed for production of flow within a vessel. High efficiency of production of flow is important for many applications, including but not limited to flow sensitive mixing operations, such as blending of miscible liquids and solids suspension in liquids.

The benefits of high impeller efficiency typically include the potential energy saving during the operation and lower capital cost of the equipment due to low power consumption and subsequently small size.

Two parameters used in the calculation of impeller efficiency are Power Number (Np) and Flow Number (Nq). Both numbers typically are known as characteristic dimensionless constants of an impeller and can only be accurately determined experimentally. Pumping efficiency is traditionally expressed as flow per unit horsepower or more recently as the cube of the flow number divided by the power number ($Nq^3/Np$).

High efficiency mixer pumping is typically achieved by utilizing marine propulsion propeller geometry which can include, but is not necessarily limited to, the geometric features known as helix, rake, camber, and skew. However the objective of a marine propeller, which is designed to produce thrust and generates flow as an unwanted byproduct, is diametrically opposite the objective of a propeller used in mixing, which is designed to produce flow that exhibits a specific velocity profile on the discharge side of the prop and where any thrust generated is an unwanted byproduct.

High pumping-efficiency propellers typically are created using a casting process where the geometry is machined into a mold using computer numerically controlled (CNC) milling machinery. CNC produced molds include those used to make metallic impellers and plastic impellers including fiberglass-reinforced-plastic (FRP). The process of casting or molding enables a manufacturer to design and produce virtually any configuration of impeller. In order to reduce impeller fabrication cost, particularly for large impellers since the cost of casting tooling increases exponentially with size, mixing impeller blades have, in the past, been fabricated from flat sheet metal stock, where rolls, bends, or combinations of rolls and bends, placed at strategic locations, have been used to simulate the more complex geometry found in molded propellers. These sorts of fabricated sheet metal impellers, that approximate higher efficiency helically based propellers, have been aggregately known in the mixing field as hydrofoils. Several hydrofoil impeller configurations are known, such as those of U.S. Pat. No. 5,297,938 (Von Essen et al), U.S. Pat. No. 4,468,130 (Weetman et al), and U.S. Pat. No. 5,052,892 (Fasano et al).

In some industrial applications, especially municipal waste water processing, rags (that is, stringy fibrous rag-like matter) collect on the impeller blades, causing loss of efficiency and shaft loading that can damage equipment, and often eventually requiring the mixer to be shut off for cleaning. The commercial embodiments of the 938, 130, and 892 hydrofoil patents have straight blades that are prone to collection of rags. Examples of mixing impellers that have been designed to resist the accumulation of rags, all of which are not hydrofoil impellers, include U.S. Pat. No. 1,850,199 (Bryant); U.S. Pat. No. 3,904,714 (Rooney et al); U.S. Pat. No. 4,163,631 (Connolly et al); U.S. Pat. No. 4,571,090 (Weetman et al); U.S. Pat. No. 4,575,256 (Armitage et al); and U.S. Pat. No. 7,473,025 (Howk). Examples of non-mixing impellers (also known as marine propellers) that have been designed to resist the accumulation of fibrous material include U.S. Pat. No. 4,482,298 (Hannon et al); and U.S. Pat. No. 5,249,993 (Martin); U.S. Pat. No. 4,163,631 (Connolly). An example of a mixing impeller that was not intentionally designed as rag-resistant but exhibits geometric properties that could provide some level of rag-resistance is U.S. Pat. No. 3,5142,1343 (Stoelting).

The current state of the art of rag-resistant mixing impellers do not embody high pumping efficiency geometry such as can be found in hydrofoil impellers or helically based propellers. Helically based marine propellers that have been designed to resist the accumulation of fibrous material are fabricated using casting technology and therefore require more expensive production tooling than is utilized in the fabrication of hydrofoil mixing impellers. Therefore, there is a need for an improved rag-resistant mixing impeller design that exhibits the higher pumping efficiencies found in helically based cast impellers, but that can also be made using the cost effective formed sheet metal fabrication techniques used in existing hydrofoil mixing impellers.

SUMMARY

The inventors have demonstrated that an impeller described herein has the advantages of high efficiency and good anti-ragging properties. The impeller blades have the advantage of, in some embodiments, being formed from a starting material of flat metal stock. Inventive methods include deciding on a desired formed impeller blade configuration and then mathematically "unwinding" or "unrolling" the finished blade configuration to determine the configuration of the flat blank and then forming the blades with simple manufacturing methods, including in the preferred embodiment which is a single rolling process, or a series of closely spaced small bends, which in aggregate conform to a single roll configuration.

An anti-ragging impeller comprises: a hub and plural, elongate blades extending from the hub, each one of the blades being formed of a sheet of metal and having a curved leading edge, a curved trailing edge, and a roll radius. Preferably, the each one of the blades has a rearward skew, and also preferably, a forward rake. The impeller blades may each have a trailing edge that defines an approximate helix. Preferably, each one of the blades has a planar root portion that can mate to corresponding hub plates or ears by fasteners through a root portion of the impeller and a plate. Heads of the fasteners may be recessed to enhance anti-ragging properties and the fasteners may engage threads tapped into the blade base such that separate nuts, which may collect rags, are eliminated.

The roll radius may be defined by a single, constant radius or formed by discrete breaks. Preferably, the roll radius is between approximately 1.25 and 0.375 the impeller diameter, more preferably, between approximately 0.9 and 0.5 the impeller diameter, more preferably between approximately 0.8 and 0.7 the impeller diameter, and in the embodiment shown in the figures, approximately 0.75 the impeller diameter.

The impeller may have a pitch to diameter ratio of approximately 0.2 to 5.0, more preferably approximately 0.4 to 0.8, more preferably, approximately 0.5 to 0.7, and in the embodiment shown in the figures approximately 0.6. Also, the pitch to diameter ratio varies no more than about 20 percent from an average pitch to diameter ratio, more preferably no more than about 15 percent from an average pitch to diameter ratio, and more preferably no more than about 10 percent from an average pitch to diameter ratio. The impeller outside diameter preferably is between approximately 24 inches and 120 inches.

The maximum width of the impeller blade, as defined by the different radii, is between 0.025 and 0.1 the impeller diameter, preferably between 0.04 and 0.06 the impeller diameter, and in the embodiment shown in the figures approximately 0.05 the impeller diameter. The blades have an inside curve and an outside curve such that the width of the impeller blade tapers on each end.

A method for forming an anti-ragging impeller comprises the steps of:

providing an arcuate impeller blade blank formed of a planar sheet metal, the blank having an inside curve, an outside curve, at tip and a root; and rolling at least a portion of the blank to form an impeller blade in which the inside curve forms an impeller trailing edge and the outside curve forms the impeller leading edge; and wherein the trailing edge approximately forms a helix and the blades are capable of being assembled into an impeller. The rolling step preferably is a single rolling step that produces a single rolling radius. Alternatively, the rolling step is several bending steps. The steps may be performed to achieve the blade configurations described in the above paragraphs in this Summary section, and the structure described in the above section represents the preferred structure, and the present invention encompasses other structure as broadly defined in the claims.

BRIEF DESCRIPTION OF THE DRAWINGS

FIG. 1 is a side view of an impeller assembly according to an embodiment of the present invention;

FIG. 2 is a top view of the impeller assembly of the FIG. 1;

FIG. 3 is a top view of a formed impeller blade shown in FIG. 1;

FIG. 4 is an edge view of the formed impeller blade shown in FIG. 3;

FIG. 5 is a view of the formed impeller blade shown in FIG. 3 showing parameters of the preferred embodiment normalized for diameter;

FIG. 6 is a view of the formed impeller blade shown in FIG. 4 showing parameters of the preferred embodiment normalized for diameter;

FIG. 7 is a side view of the formed impeller blade shown in FIG. 3;

FIG. 8 is a side view orthogonal to the side view shown in FIG. 7;

DETAILED DESCRIPTION OF ILLUSTRATIVE EMBODIMENTS

Figure 10:
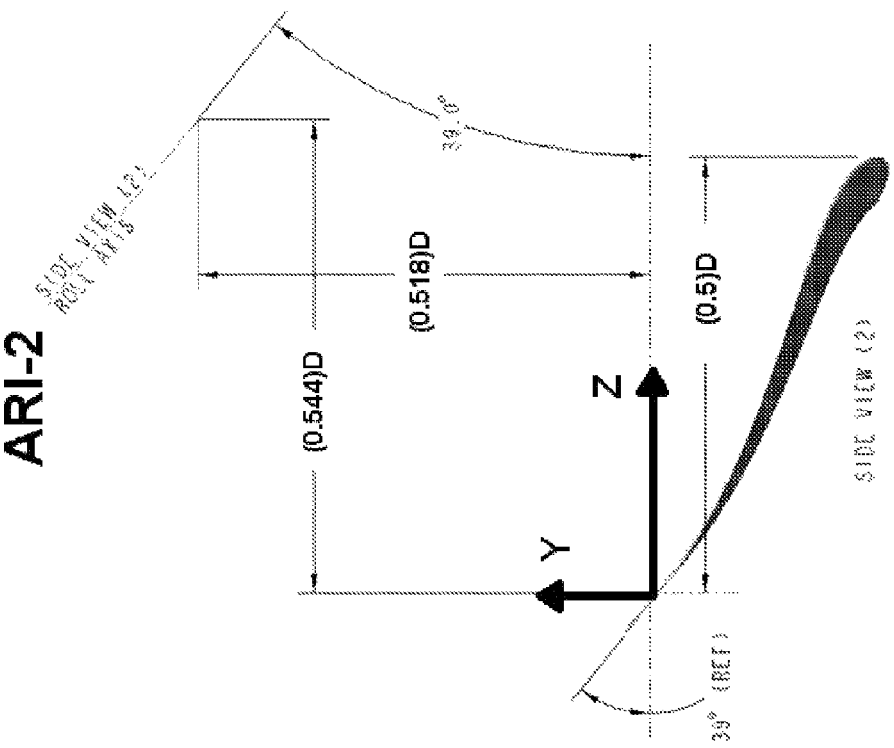
FIG. 10 is a view of the impeller blade shown in FIG. 8 showing parameters of the preferred embodiment normalized for diameter.
Figure 9:
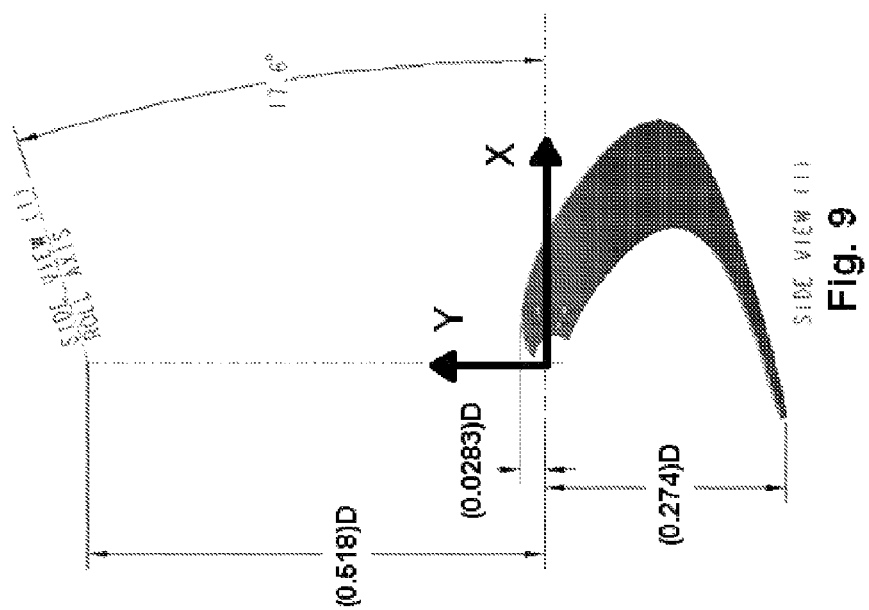
FIG. 9 is a view of the impeller blade shown in FIG. 7 showing parameters of the preferred embodiment normalized for diameter.

Referring to FIGS. 1 and 2, impeller assembly 110 includes a hub 112 and plural blades 130. Hub 112 preferably is conventional and includes a body 114 that is configured to be attached to a shaft (not shown in the figures), which is intended to be driven according to parameters chosen for the particular application, as will be understood by persons familiar with mixer technology in light of the present disclosure. As oriented in FIG. 2, impeller 110 rotates clockwise to achieve a down-pumping of fluid (as oriented in FIG. 1). In FIGS. 1 and 2, the bolts are removed from the views for clarity.

Hub 112 includes a hub plate or ear 116 for each impeller blade. Hub ears 116 extend radially outwardly from hub body 114. Hub ears 116, as shown in the figures, are oriented relative to an axial centerline by a hub ear angle of 39 degrees. Any hub ear angle is contemplated, and the present invention is not limited to any hub ear angle.

Preferably, impeller assembly 110 includes three impeller blades 130, which are affixed to the three hub ears 116 be means of bolts using holes 120 which reside on both the blade flats as well as the hub ears and are aligned with respect to one another, or affixed to the hub ear by welds, or by other mechanisms. As shown in FIGS. 1 through 10, each blade 130 includes a root portion or flat 132 and a roll portion 134, which terminates at a tip 136. A trailing edge 138 and a leading edge 140, and a lower or pumping surface 142 and an upper or back surface 144, are defined on impeller blade 130. Roll portion 134 is oriented such that it is generally concave when viewed from above (that is, for embodiments having a single roll radius, the center of the roll radius has a location above the impeller blades as oriented in FIG. 1).

Each impeller blade 130 has a high degree of rearward or swept-back skew. As used herein, the term "skew" is used conventionally to refer to the degree to which the top-view blade profile is swept forward or back. The preferred example has rearward skew, so the outermost tip is skewed towards the trailing edge (that is, in the downstream direction). Impeller blade 130 has skew that is progressively greater toward the outer radius. As best shown in the top view of FIG. 2, the preferred embodiment 110 rotates clockwise to achieve a down-pumping of fluid, therefore the skew in this embodiment affects the top-view profile such that the outermost parts of the blade are located counterclockwise from the innermost parts of the blade.

Impeller 110 has a forward rake. As used herein, the term "rake" is used conventionally to refer to a tilting of the blade geometry 130, in this case forwardly away from the central hub 112 (that is, blades 130 are over-hung away from hub 112, the hub 112 preferably being at the furthest extremity of the drive shaft).

Impeller blades 130 have a curvature that is defined by at least one roll radius having a center that is above the blade as oriented in FIGS. 1 and 2. Preferably, impeller blades 130 have a single roll radius R1, as described more fully below.

The inventors surmise that it is advantageous to choose a roll radius configuration and a shape of impeller blade such that the trailing edge blade angle at a given radial position R with respect to a horizontal plane and tangent to a cylinder whose radius is R and whose center is coincident with the hub axis of rotation conforms to the angle of a pure helix of a given pitch, pitch defined in the traditional way, whose center lies at the hub axis of rotation at the same radial position R, tangent to a similarly positioned cylinder of radius R and also with respect to the horizontal plane. An alternative to the single roll radius is a series of bends or breaks spaced apart along the length of blade 130. In this regard, several bends or breaks can mimic a single roll radius. Further, the present invention is not limited to configurations in which the roll radius (whether created smoothly or with discrete breaks or bends) is constant unless specifically recited in the claims.

The present invention is not limited to particular parameters, such as blade roll parameters, blade angles, dimensions, helical shapes, and the like, disclosed herein. For example, the present invention encompasses an impeller blade having a single roll radius, a single roll radius that is formed not by rolling but rather by multiple breaks or bends (and the inventors intend the term "roll" and "roll radius" to encompass blade configuration formed by rolling or like configuration formed by bending or breaking), and multiple roll radii, regardless how formed. The present invention should be given the full benefit of the scope in the claims.

Theoretically, a pure geometric helix may be preferred, but manufacturing efficiency and practical considerations make deviation from a helix acceptable. The claimed invention mimics or approximates the properties of a helix only at its trailing edge. In this regard, even in embodiments in which a constant pitch is desired, a pitch to diameter ratio measured in 10 degree increments of radius (that is, when viewed from above, viewing increments of the radial dimension), the pitch to diameter ratio may vary up to and including about 20 percent from the average pitch to diameter ratio, preferably no more than about 15 percent, and most preferably no more than about 10 percent from an average pitch to diameter ratio. The parameter of pitch to diameter ratio is used to normalize the parameter of pitch and to describe the preferred limitations on variability of pitch.

Regarding the magnitude of the pitch, which is normalized to diameter to provide parameters of the pitch across a family of impeller sizes, impeller 110 preferably has a pitch to diameter ratio of approximately 0.2 to 5.0, more preferably a pitch to diameter ratio of approximately 0.3 to 2.0, more preferably approximately 0.4 to 0.8, more preferably approximately 0.5 to 0.7, and in the preferred embodiment shown in the figures a pitch to diameter ratio of approximately 0.6. The values for pitch to diameter ratio are, as described above, averages. If an average pitch must be measured, pitch may be calculated from the measured pitch at increments of 10 percent of the radius and then arithmetically averaged. The present invention is not limited to any size impeller, but preferably the impeller 110 has a diameter of between approximately 24 inches and 120 inches.

Preferably, the trailing edge of the blade, at each particular radius under consideration, can be made to conform to the desired angle by means of manipulating the roll design parameters to approximately equal the arctangent of the desired pitch divided by the quantity ((2)(pi)(the radius under consideration). The term "pitch" in this regard is used conventionally to mean the distance a pure helical prop will "screw" itself into a fluid during one full 360 degree rotation of the prop assuming zero slippage of the prop with respect to the fluid.

The inventors have determined that impeller 110 has attributes that result in significant anti-ragging performance. In this regard, impeller 110 because of some or all of its curvature(s), the form fitting configuration between hub ears 16 and planar flat portions 132, and the use of low profile or recessed or smooth fasteners tends to have diminished accumulation of fibrous material in, for example, wastewater applications.

Blades 130 are also relatively thin. Impeller blades 130 forming an impeller diameter of 97 inches preferably have a thickness of 0.375 inches and are formed from steel of components chosen according to well-known parameters. In this regard, blade thickness may be chosen by balancing the gravity related blade stress (gravity acts downwards) against the up-thrust acting against a down-pumping blade. For example, a theoretical optimization point may be a blade whose at-rest gravity induced stress is equal and opposite to the process induced stresses allowing a theoretically perfectly optimized blade to have zero bending stress while in operation. Alternatively, another theoretical optimization point would be to choose operating loads approximately twice that of gravity such that during operation the blade will deflect past the neutral point and reside at a particular specified design stress. Other calculation methods may be used.

The preferred embodiment of impeller 110 disclosed herein is a very high efficiency impeller that has Power Number Np=0.15 and Flow Number Nq=0.54. Both numbers were measured in the lab scale. Power Number was determined by measurement of mixing torque and Flow Number was determined by incorporating PIV (Laser Particle Image Velocimetry). The inventors' data shows that the preferred impeller described herein produces significantly improved flow per kW power invested in mixing, such as 1.7 to 2.0 times more flow per kW power, than embodiments of the impellers shown in U.S. Pat. No. 5,297,938 (Von Essen Et Al), U.S. Pat. No. 4,468,130 (Weetman Et Al), and U.S. Pat. No. 5,052,092 (Fasano et al).

Figure 11:
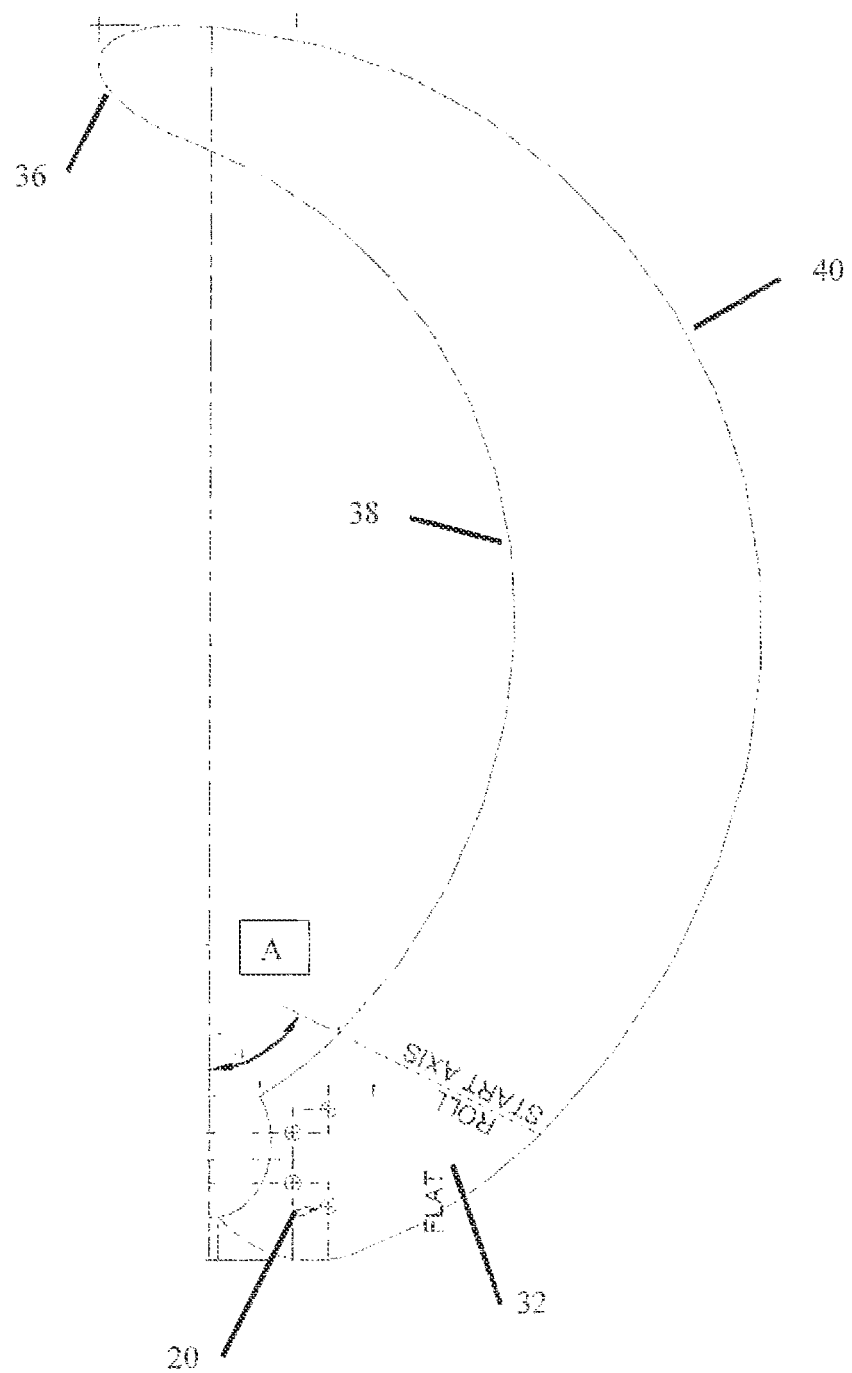
FIG. 11 is a top view of a flat blank that is used to form the blades shown in FIGS. 3 through 10.

According to another aspect of the present invention, a method for forming impeller 110 includes cutting a blank from metal sheet or plate and selectively rolling a portion of the blank in a conventional metal roll. Referring to FIG. 11, a blank 30 is formed of a steel or alloy plate. The dimensions (which are provided relative to outside diameter D of impeller 110) and steps for making blank 30 and deforming blank 30 to make impeller blade 130 may be chosen to achieve the configuration of impeller 130 described herein.

Blank 30 includes an internal curved edge 38 and an external curved edge 40. Preferably, curve 38 corresponds to trailing edge 138 and curve 40 corresponds to leading edge 140 of the finished impeller 130. A tip 36 of blank 30 is rounded. Blade 30 includes a planar rootflat 32.

The dimensions of blank 30 are chosen to achieve the desired configuration of impeller 130. Accordingly, the dimensions are provided to illustrate preferred dimensions of impeller 130, and the dimensions of blank 30 may be calculated to achieve the desired shape of the finished impeller 130. Commercially available CAD software is helpful to calculate the shape of blank 30 from the desired impeller configuration 130. As shown in the figures, trailing edge 138 and leading edge 140 have radii R3 and R2 of 0.225 D and 0.275 D, as illustrated in FIGS. 4 and 5. Radius R2 has a center C0 having x-z coordinates of zero and Z3 of 0.225 D when the origin from which x and z dimensions are measured is defined as the axial centerline of the impeller. Radius R3 has a center C1 having x-z coordinates X1, Z2 of 0.072 D and 0.225 D.

Thus blank 30, and blade 130, has a crescent shape that is elongate. Preferably, the difference between curve 140 and curve 138 (which is one aspect of defining the elongate configuration) is between 0.025 and 0.1 the impeller diameter, more preferably, between 0.04 and 0.06 the impeller diameter, and preferably approximately 0.05 the impeller diameter (that is, 0.275 D minus 0.225 D).

FIGS. 3, 7, and 8 illustrate a point C2, which lies in the y-z plane and is a point on the roll axis. The x, y, z coordinates of point C2 relative to the origin are zero, Y4 of 0.518 D, and Z1 of 0.544 D. The roll axis angle projected onto the x-y plane (A2 in FIG. 7) is 17.6 degrees, onto the x-z plane (A1 in FIG. 3) is 21.4 degrees, and on to the y-z plane ((A3 in FIG. 8) is 39.0 degrees. As shown on blank 30 of FIG. 11, angle A is the position of the roll angle applied to blank 30. Angle A of the flat plate can be back calculated from the component angles, and will change depending on the hub ear configuration, bolt hole orientation, desired helix angle, and other parameters. The length of the planarflat 132 may be determined by structural and practical considerations, such as space required for a desired bolt pattern.

Tip 136 preferably is defined by a higher order (exponential) type of curve. The particular curvature in the embodiment shown in the figures was achieved by first drawing the leading and tailing edges, which are simple arcs, drawing the circular arc that is the OD, and then using a curve type to make a curve that was tangent to the OD and to the trailing edge. A "circumferential length" of the tip was chosen to determine the final tip geometry. Commercial CAD tools, such as provided by Pro-E software, were employed. The parameters of the tip configuration include that the tip is tangent to the OD and the trailing edge arc and its circumferential height. Refinements to the tip may be made, according to known parameters.

The present invention is not limited to a single roll radius, but rather encompasses other structure as defined by the full scope of the claims. The roll radius preferably is chosen with roll angle, hub ear angle, and blade 30 dimensions to achieve the desired configuration of impeller blade 130, such as a helix defined by the trailing edge. Preferably, the roll radius R1 is between approximately 1.0 and 0.33 the impeller diameter, more preferably between approximately 0.9 and 0.5 the impeller diameter, more preferably between approximately 0.8 and 0.7 the impeller diameter, and in the embodiment shown in the figures, approximately 0.75 the impeller diameter.

Reference dimensions of impeller curve height Y4 (FIG. 4) preferably is 0.134 D. An impeller curve length Z5 of 0.5 D is illustrated in FIG. 10.

The present invention as been described with respect to a preferred embodiment, and also with respect to preferred ranges of parameters. Only the claim language is intended to be a limitation, and the parameters and ranges of parameters are not intended to limit the scope of the present invention unless expressly recited in the claims.

What is claimed:

1. A method for forming an anti-ragging impeller comprising the steps of:
   providing an arcuate impeller blade blank formed of a planar sheet metal, the blank having an inside curve, an outside curve, a tip and a root;
   rolling at least a portion of the blank from the root to the tip to form an impeller blade in which the inside curve forms an impeller trailing edge and the outside curve forms the impeller leading edge; and
   orienting the rolled impeller blade with respect to an axis of rotation such that the trailing edge from the root to the tip approximates the properties of a helix, and the blades are capable of being assembled into an impeller.

2. The method of claim 1 wherein the rolling step is a single rolling step that produces a single rolling radius.

3. The method of claim 2 wherein the roll radius is between approximately 1.0 and 0.33 the impeller diameter.

4. The method of claim 2 wherein the roll radius is between approximately 0.9 and 0.5 the impeller diameter.

5. The method of claim 2 wherein the roll radius is between approximately 0.8 and 0.7 the impeller diameter.

6. The method of claim 2 wherein the roll radius is approximately 0.75 the impeller diameter.

7. The method of claim 2 wherein the impeller blade is concave up such that a center of the rolling radius is above the impeller blade.

8. The method of claim 2 wherein the blank is rolled about a roll axis, wherein the roll axis and the axis of rotation do not intersect.

9. The method of claim 2 wherein the rolling step comprises rolling at least a portion of the blank from tip to root.

10. The method of claim 1 wherein the rolling step is several bending steps.

11. The method of claim 1 wherein the impeller blade is elongate.

12. The method of claim 1 wherein the trailing edge approximates a helix of of a similar pitch.

13. The method of claim 1 wherein each one of the blades has a planar root portion.

14. The method of claim 13 wherein the impeller is connected to the hub by fasteners through the planar root portion of the impeller and a plate, wherein heads of the fasteners are recessed to enhance anti-ragging properties and the fasteners may engage threads tapped into the planar root portion.

15. The method of claim 1 wherein the impeller has a pitch to diameter ratio of approximately 0.2 to 5.0.

16. The method of claim 15 wherein a pitch to diameter ratio varies no more than about 20 percent from an average pitch to diameter ratio.

17. The method of claim 15 wherein a pitch to diameter ratio varies no more than about 10 percent from an average pitch to diameter ratio.

18. The method of claim 1 wherein the impeller has a pitch to diameter ratio of approximately 0.7 to 0.5.

19. The method of claim 1 wherein the impeller has a pitch to diameter ratio of approximately 0.6.

20. The method of claim 1 wherein a maximum width of the impeller blade is between 0.04 and 0.06 the impeller diameter.

21. A method for forming an anti-ragging impeller comprising the steps of:
   forming an arcuate impeller blade blank out of planar sheet metal, the blank having an inside curve, an outside curve, a tip and a root;
   orienting the blank with respect to a roll axis, the roll axis being above a top surface of the blank;
   rolling at least a portion of the blank from the root to the tip about the roll axis to form an impeller blade in which the inside curve forms an impeller trailing edge and the outside curve forms the impeller leading edge; and
   coupling the rolled impeller blade to a hub, the rolled impeller blade and the hub being configured to rotate about an axis of rotation that extends through a center of the hub, the axis of rotation and the roll axis do not intersect, the trailing edge having a blade angle at a given radial position R with respect to a horizontal plane and tangent to a cylinder whose radius is at the radial position R and whose center is coincident with the axis of rotation conforms to an angle of a pure helix of a given pitch whose center lies at the axis of rotation at the same radial position R, tangent to a similarly positioned cylinder of radius R and with respect to the horizontal plane.

22. The method of claim 21, wherein an inner non-rolled flat portion of the blade is 39.0° with respect to the horizontal plane.

* * * * *